(12) United States Patent
Jiang et al.

(10) Patent No.: US 10,739,251 B2
(45) Date of Patent: Aug. 11, 2020

(54) HIGH TEMPORAL RESOLUTION MUELLER MATRIX ELLIPTICAL POLARIZATION MEASURING DEVICE AND METHOD

(71) Applicant: Huazhong University of Science and Technology, Wuhan, Hubei (CN)

(72) Inventors: Hao Jiang, Wuhan (CN); Jiamin Liu, Wuhan (CN); Shiyuan Liu, Wuhan (CN); Song Zhang, Wuhan (CN); Zhicheng Zhong, Wuhan (CN); Xiuguo Chen, Wuhan (CN); Honggang Gu, Wuhan (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 109 days.

(21) Appl. No.: 16/126,230

(22) Filed: Sep. 10, 2018

(65) Prior Publication Data
US 2019/0369006 A1    Dec. 5, 2019

(30) Foreign Application Priority Data

May 30, 2018   (CN) .......................... 2018 1 0536399

(51) Int. Cl.
*G01N 21/21*      (2006.01)
*G02B 5/30*       (2006.01)

(52) U.S. Cl.
CPC ......... *G01N 21/211* (2013.01); *G02B 5/3025* (2013.01); *G02B 5/3083* (2013.01); *G01N 2201/0636* (2013.01); *G01N 2201/0683* (2013.01)

(58) Field of Classification Search
CPC .............................. G01N 21/211; G01B 11/06
See application file for complete search history.

(56) References Cited

U.S. PATENT DOCUMENTS

| | | | | |
|---|---|---|---|---|
| 5,335,066 A | * | 8/1994 | Yamada | G01N 21/211 356/364 |
| 5,835,220 A | * | 11/1998 | Kazama | G01J 4/04 356/369 |
| 5,910,841 A | * | 6/1999 | Masao | G01B 11/065 356/369 |

(Continued)

FOREIGN PATENT DOCUMENTS

CN         104677838 A      6/2015

*Primary Examiner* — Shawn Decenzo
(74) *Attorney, Agent, or Firm* — Hamre, Schumann, Mueller & Larson, P.C.

(57) ABSTRACT

The present invention discloses a high temporal resolution Mueller matrix elliptical polarization measuring device and method. In the incident light path, four polarization modulation channels are used to split and modulate a pulse laser beam into four polarized beams in independent polarization states. Due to different light path differences, the pulse beams have a time interval of several nanoseconds, and thus four pulse laser beams are successively irradiated on the surface of the sample. In the reflected light path, six channel polarization detection modules are used to synchronously measure the Stokes vectors of the reflected beams on the sample surface. By using known incident and reflected Stokes vectors of the four pulse beams, linear equations can be solved to obtain the Mueller matrix of the sample.

10 Claims, 3 Drawing Sheets

(56) References Cited

U.S. PATENT DOCUMENTS

| | | | | |
|---|---|---|---|---|
| 6,134,011 A * | 10/2000 | Klein | G01J 4/04 | 250/225 |
| 6,211,957 B1 * | 4/2001 | Erdogan | G01J 4/04 | 356/364 |
| 6,384,916 B1 * | 5/2002 | Furtak | G01J 3/447 | 356/369 |
| 7,027,155 B2 * | 4/2006 | Cordingley | B23K 26/032 | 356/401 |
| 7,492,455 B1 * | 2/2009 | Johs | G01J 3/02 | 356/364 |
| 8,305,578 B1 * | 11/2012 | Mudge | G01N 21/21 | 356/367 |
| 8,531,650 B2 * | 9/2013 | Feldkhun | G01B 11/2536 | 356/4.01 |
| 9,069,105 B2 * | 6/2015 | Kurtz | G02B 7/028 | |
| 9,793,673 B2 * | 10/2017 | Chuang | G02B 5/3083 | |
| 9,967,037 B2 * | 5/2018 | Bitauld | H04B 10/70 | |
| 10,540,571 B2 * | 1/2020 | Hoover | G06K 9/6232 | |
| 2006/0023987 A1 * | 2/2006 | Yao | G01J 4/00 | 385/11 |
| 2009/0103093 A1 * | 4/2009 | Liphardt | G01N 21/211 | 356/369 |
| 2009/0244516 A1 * | 10/2009 | Mehendale | G01N 21/8422 | 356/33 |
| 2010/0245819 A1 * | 9/2010 | Li | G01B 11/0641 | 356/327 |
| 2013/0321810 A1 * | 12/2013 | Wang | G01N 21/211 | 356/369 |
| 2015/0219497 A1 * | 8/2015 | Johs | G01N 21/211 | 356/367 |
| 2015/0330770 A1 * | 11/2015 | Poslavsky | G01B 21/04 | 702/172 |
| 2015/0371844 A1 * | 12/2015 | Fliegel | H01L 29/20 | 438/478 |
| 2017/0102319 A1 * | 4/2017 | De Martino | A61B 1/07 | |
| 2017/0356800 A1 * | 12/2017 | Krishnan | G01J 3/0224 | |
| 2018/0164566 A1 * | 6/2018 | Chen | G02B 6/42 | |
| 2019/0094130 A1 * | 3/2019 | Blasenheim | G02B 27/0075 | |

\* cited by examiner

HIGH TEMPORAL RESOLUTION MUELLER MATRIX ELLIPTICAL POLARIZATION MEASURING DEVICE AND METHOD

BACKGROUND OF THE PRESENT INVENTION

Field of the present invention

The present invention belongs to the field of optical measurement technology in the preparation process of complex nanostructures, especially in the field of online dynamic monitoring and optimization control of the thickness or optical properties of the complex nanostructures, such as the holographic polymer by photopolymerization, the self-assembled material, the ordered porous film and the nanorods or the nanoparticles array composite structure on the flexible substrate, which particularly relates to a high temporal resolution Mueller matrix elliptical polarization measuring device and method.

Description of the Related Art

An ordered material in a complex nanostructure refers to a material formed by arrangement according to a certain rule or arrangement of a plurality of components at a certain level. Such spatially ordered materials generally have better performance than disordered structural materials: for example, polyaniline/silicon nanoparticle shell-core materials prepared by the self-assembly technique have excellent electrical conductivity and electrochemical performance; clusters prepared by polyoxometallates through the layer-by-layer self-assembly technique are typical ordered structural materials and typical functional materials with excellent geometric configuration; and a honeycomb ordered porous film prepared by a water droplet templating method has the advantages of strict structure, high strength, light weight, good heat insulation and sound insulation and the like. In the assembly process of these ordered materials, in order to obtain optimal performance, typical nanoparticles such as gold, zirconia, titanium dioxide and zinc sulfide are usually incorporated into a plurality of polymer nanocomposites assembled. The physical properties and geometries of these nanoparticles tend to be asymmetric or anisotropic, so that these nanoparticles lead to more complex preparation mechanisms for ordered materials while imparting more properties to the ordered materials, which is manifested by rapid changes and spatial fluctuations in the local physical properties of the material. These characteristics require that the measuring technique not only enables in-situ measurement of material anisotropy, but also has a certain temporal resolution.

At present, in the preparation process of complex nanostructures (such as the preparation process of composite phase-change nanostructures by the self-assembly technique), in-situ SEM and TEM are often used as preferred tools for real-time observation of nanostructure morphology and phase. However, high-energy particle beam irradiation in SEM or TEM may have a great impact on the observed nanostructures, resulting in complex artifacts such as heating, charging and free radical generation and radiation decomposition. In addition, SEM and TEM have other drawbacks: on the one hand, the temporal resolution is not high and thus the dynamic preparation process of complex nanostructures cannot be characterized; and on the other hand, the physical properties of complex nanostructures cannot be measured.

In the existing Mueller matrix ellipsometry, for example, in the self-calibration type full-Mueller-matrix ellipsometer measurement system disclosed in Chinese Patent Application No. 201310624769.6, double rotation compensators are used to perform Fourier modulation on the polarization state of the beam. Although the measured Mueller matrix has high measurement precision and accuracy, the Miller matrix measurement process may take several seconds, which restricts its application in dynamic characterization of the reaction mechanism and particle transport properties in the preparation process of complex nanostructures.

SUMMARY OF THE PRESENT INVENTION

In view of the above-described problems, the present invention provides a high temporal resolution Mueller matrix elliptical polarization measuring device and method, which aims to produce a time difference by pulse beam splitting, polarization and path processing, so that the received pulse beam has an easy-to-distinguish periodicity and the period can be as low as the pulse emission period of the pulse beam, thereby obtaining a Mueller matrix with high temporal resolution. Further, high-speed characterization of material anisotropy is achieved, which facilitates the use of the Mueller matrix with high temporal resolution to analyze the reaction mechanisms or transport properties of particle molecules in complex nanostructures.

In order to achieve the above objective, the present invention provides a high temporal resolution Mueller matrix elliptical polarization measuring device for measuring a Mueller matrix of a material to be tested, which comprises an incident light path and a reflected light path;

the incident light path includes a short-pulse laser source, a polarizer and first to fourth polarization modulation channels; a beam emitted by the short-pulse laser source passes through the polarizer, successively enters the first to fourth polarization modulation channels, and is then subjected to polarization modulation by first to fourth ¼ wave plates having different azimuths in the first to fourth polarization modulation channels so that four sub-pulse incident beams with uncorrelated Stokes vectors are obtained, successively projected onto the material to be tested and then enter the reflected light path after being reflected by the material to be tested;

the reflected light path includes two non-polarization beam splitter, a fifth ¼ wave plate, a ½ wave plate, a first polarization beam splitter, a second polarization beam splitter, a third polarization beam splitter, six detection modules, an oscilloscope and a computer;

the beam reflected by the material to be tested is split into three beams by two non-polarization beam splitters; a first beam is modulated by the fifth ¼ wave plate and enters the first polarization beam splitter, a second beam is modulated by the ½ wave plate and enters the second polarization beam splitter, and a third beam enters the third polarization beam splitter; the three beams are split into six beams by the first to third polarization beam splitters, the six beams are converted into electrical signals by six detection modules in one-to-one correspondence, and then the electrical signals enters the oscilloscope and the computer.

Further, the first polarization modulation channel includes a first non-polarization beam splitter, a first ¼ wave plate and a second non-polarization beam splitter sequentially arranged in order of light propagation; the first non-polarization beam splitter and the second non-polarization beam splitter are perpendicular to each other and reflective surfaces thereof are oppositely disposed;

the second polarization modulation channel includes a third non-polarization beam splitter, a second ¼ wave plate and a fourth non-polarization beam splitter sequentially arranged in order of light propagation; the third non-polarization beam splitters and the fourth non-polarization beam splitter are perpendicular to each other and reflective surfaces thereof are oppositely disposed;

the third polarization modulation channel includes a fifth non-polarization beam splitter, a third ¼ wave plate and a sixth non-polarization beam splitter sequentially arranged in order of light propagation; the fifth non-polarization beam splitters and the sixth non-polarization beam splitter are perpendicular to each other and reflective surfaces thereof are oppositely disposed;

the fourth polarization modulation channel includes a first reflecting mirror, a fourth ¼ wave plate and a second reflecting mirror sequentially arranged in order of light propagation; the first reflecting mirror and the second reflecting mirror are perpendicular to each other and reflective surfaces thereof are oppositely disposed;

the first non-polarization beam splitter, the third non-polarization beam splitter, the fifth non-polarization beam splitter and the first reflecting mirror are parallel to each other; and the second non-polarization beam splitter, the fourth non-polarization beam splitter, the sixth non-polarization beam splitter and the second reflecting mirror are parallel to each other.

Further, the first to fourth polarization modulation channels are equally spaced, and have the same length.

Further, the interval between the first and second polarization modulation channels is $L_1$, the interval between the second and third polarization modulation channels is $L_2$, the interval between the third and fourth polarization modulation channels is $L_3$, and lengths of the first to fourth polarization modulation channels are all $L_4$, where $L_1=L_2=L_3=2L_4$.

Further, $L_4=0.3$ m.

Further, fast axis azimuths of the first to fourth ¼ wave plates are 0°, 22.5°, 45°, and 60°, respectively.

Further, the short-pulse laser source is configured to provide Gaussian-shaped light source pulses with a period of 20 ns and a pulse width of 2 ns.

Further, transmission reflectance ratios of the two non-polarization beam splitters (1001, 1101) are 2:1 and 1:1, respectively.

In order to achieve the above objective, the present invention further provides a Mueller matrix elliptical polarization measuring method using the high temporal resolution Mueller matrix elliptical polarization measuring device, characterized by comprising:

(1) adjusting an incident angle of the incident light path to be approximately equal to the Brewster angle of the sample to be tested;

(2) generating a series of Gaussian-shaped pulse beams with a pulse interval of $T_s$;

(3) splitting each pulse beam into four beams, and then modulating the four beams into four sub-pulse incident beams with uncorrelated Stokes vectors by four ¼ wave plates with different fast axis azimuths, the Stokes vectors of the four sub-pulse incident beams being $S_a$, $S_b$, $S_c$ and $S_d$;

(4) assuming that 4×4 Mueller matrix of the sample to be tested is $M_s$, the Mueller matrix of the sample to be tested is $M_s(k)$ within the kth pulse repetition period of $T_s$, and the Mueller matrix of the sample to be tested is $M_s(k+1)$ within the (k+1)th pulse repetition period of $T_s$;

successively irradiating the four sub-pulse incident beams within each pulse repetition period of $T_s$ on the surface of the sample to be tested so that corresponding four sub-pulse reflected beams successively enter the reflected light path;

(5) within the kth pulse repetition period of $T_s$, splitting any one of the sub-pulse reflected beams entering the reflected light path into six smaller sub-beams, and detecting light intensities of the six sub-beams, the light intensities of the six sub-beams being respectively recorded as $I_1 \sim I_6$, so that the Stokes vector corresponding to the sub-pulse reflected beam is represented as:

$$S_m=[S_0,S_1,S_2,S_3]^T,$$

where $S_0=(I_1/g_1+I_2/g_2+I_3/g_3+I_4/g_4+I_5/g_5+I_6/g_6)$,
$S_1=(I_1/g_1-I_2/g_2)/(I_1/g_1+I_2/g_2)$,
$S_2=(I_3/g_3-I_4/g_4)/(I_3/g_3+I_4/g_4)$,
$S_3=(I_5/g_5-I_6/g_6)/(I_5/g_5+I_6/g_6)$, where $g_1 \sim g_6$ represents gain coefficients during the detection of light intensities of the six sub-beams;

(6) similarly to the step (5), obtaining Stokes vectors of the four sub-pulse reflected beams within the kth pulse repetition period of $T_s$, the Stokes vectors being respectively $S_{ma}(k)$, $S_{mb}(k)$, $S_{mc}(k)$ and $S_{md}(k)$; and (7) solving linear equations $S_{ma}(k)=M_s(k) \cdot S_a$, $S_{mb}(k)=M_s(k) \cdot S_b$, $S_{mc}(k)=M_s(k) \cdot S_c$ and $S_{md}(k)=M_s(k) \cdot S_d$ to obtain a Mueller matrix $M_s(k)$ of the sample within the kth pulse repetition period of $T_s$.

Further, in the step (3):

a first sub-pulse incident beam is modulated by the ¼ wave plate with a fast axis azimuth of 0°, and is then incident on the surface of the sample to be tested, the Stokes vector of the first sub-pulse incident beam being $S_a=[1, 1, 0, 0]^T$;

a second sub-pulse incident beam is modulated by the ¼ wave plate with a fast axis azimuth of 22.5°, and is then incident on the surface of the sample to be tested, the Stokes vector of the second sub-pulse incident beam being $S_b=[1, 0.5, 0.5, 0.707]^T$;

a third sub-pulse incident beam is modulated by the ¼ wave plate with a fast axis azimuth of 45°, and is then incident on the surface of the sample to be tested, the Stokes vector of the third sub-pulse incident beam being $S_c=[1, 0, 0, 1]^T$; and a fourth sub-pulse incident beam is modulated by the ¼ wave plate with a fast axis azimuth of 60°, and is then incident on the surface of the sample to be tested, the Stokes vector of the fourth sub-pulse incident beam being $S_d=[1, 0.25, 0.433, 0.866]^T$.

In general, by comparing the above technical solution of the present inventive concept with the prior art, the present invention has the following beneficial effects:

(1) compared with the existing Mueller matrix ellipsometer and measurement method, the present invention has extremely high measurement speed, in which single measurement time is less than one beam pulse period and can be as low as 15 ns;

(2) the Mueller matrix measured by the present invention has extremely high temporal resolution, which can reach up to one beam pulse period. For example, when the beam pulse period is 20 ns, the temporal resolution can reach 20 ns;

(3) with the present invention, both the Mueller matrix of an isotropic sample and the Mueller matrix of an anisotropic sample can be measured, that is, the present invention has a wide application range; and (4) the measuring device of the present invention has a self-calibration function, and by blocking any three of the first to fourth polarization modulation channels, only the light path of the remaining one of the polarization modulation channels is unblocked, so that corresponding parameters of the corresponding polarization modulation channel can be automatically decomposed by using the measured data.

BRIEF DESCRIPTION OF THE DRAWINGS

In all figures, the same elements or structures are denoted by the same reference numerals, in which.

10—short-pulse laser source, 20—beam expander (201—small converging lens, 202—interference filter, 203—aperture, 204—large collimating lens), 30—reflecting mirror, 40—polarizer, 50—first polarization modulation channel (501—first non-polarization beam splitter, 502—¼ wave plate, 503—second non-polarization beam splitter), 60—second polarization modulation channel (601—third non-polarization beam splitter, 602—¼ wave plate, 603—fourth non-polarization beam splitter), 70—third polarization modulation channel (701—fifth non-polarization beam splitter, 702—¼ wave plate, 703—sixth non-polarization beam splitter), 80—fourth polarization modulation channel (801—reflecting mirror, 802—¼ wave plate, 803—reflecting mirror), 90—sample to be tested, 1001—seventh non-polarization beam splitter, 1002—fifth ¼ wave plate, 1003—first polarization beam splitter, 1004—first converging lens, 1005—first photomultiplier tube, 1006—first amplifier, 1007—second converging lens, 1008—second photomultiplier tube, 1009—second amplifier, 1101—eighth non-polarization beam splitter, 1102—½ wave plate, 1103—second polarization beam splitter, 1104—third converging lens, 1105—third photomultiplier tube, 1106—third amplifier, 1107—fourth converging lens, 1108—fourth photomultiplier tube, 1109—fourth amplifier, 1201—third polarization beam splitter, 1202—fifth converging lens, 1203—fifth photomultiplier tube, 1204—fifth amplifier, 1205—sixth converging lens, 1206—sixth photomultiplier tube, 1207—sixth amplifier, 1301—oscilloscope, 1400—computer, and 1500—polarization detection module.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
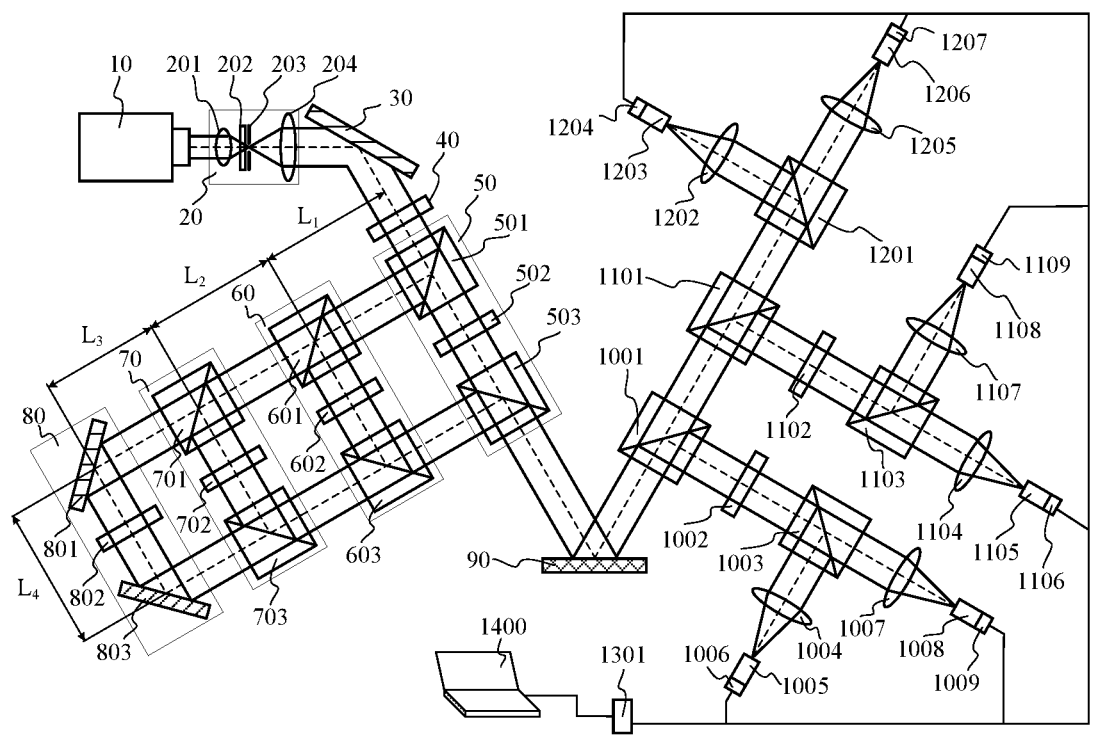
FIG. 1 is a schematic structural diagram of a high temporal resolution Mueller matrix elliptical polarization measuring device according to embodiments of the present invention.

As shown in FIG. 1, a high temporal resolution Mueller matrix elliptical polarization measuring device according to embodiments of the present invention includes a short-pulse laser source 10, a beam expander 20, a reflecting mirror 30, a polarizer 40, first to fourth polarization modulation channels 50-80, a sample 90, a seventh non-polarization beam splitter 1001, a fifth ¼ wave plate 1002, a first polarization beam splitter 1003, a first converging lens 1004, a first photomultiplier tube 1005, a first amplifier 1006, a second converging lens 1007, a second photomultiplier tube 1008, a second amplifier 1009, an eighth non-polarization beam splitter 1101, a ½ wave plate 1102, a second polarization beam splitter 1103, a third converging lens 1104, a third photomultiplier tube 1105, a third amplifier 1106, a fourth converging lens 1107, a fourth photomultiplier tube 1108, a fourth amplifier 1109, a third polarization beam splitter 1201, a fifth converging lens 1202, a fifth photomultiplier tube 1203, a fifth amplifier 1204, a sixth converging lens 1205, a sixth photomultiplier tube 1206, a sixth amplifier 1207, an oscilloscope 1301, a computer 1400 and a polarization detection module 1500.

The short-pulse laser source 10 has a pulse repetition frequency of 50 MHz and a pulse width of 2 ns, that is, the interval between adjacent two pulses generated by the laser is about 20 ns, and the duration of each beam pulse is 2 ns.

On the incident light path, the beam expander 20 is composed of a small converging lens 201, an interference filter 202, an aperture 203 and a large collimating lens 204, in which the aperture 203 is disposed at the conjugate focus of the small converging lens 201 and the large collimating lens 204, and the interference filter 202 is located between the small converging lens 201 and the aperture 203. The function of the beam expander 20 is to improve the collimating characteristic of the light beam generated by the light source, enlarge the diameter of the light beam, and filter out the background light intensity.

There are four polarization modulation channels in the incident light path, in which the first polarization modulation channel 50 includes a first non-polarization beam splitter 501, a first ¼ wave plate 502 and a second non-polarization beam splitter 503; the second polarization modulation channel 60 includes a third non-polarization beam splitter 601, a second ¼ wave plate 602 and a fourth non-polarization beam splitter 603; the third polarization modulation channel 70 includes a fifth non-polarization beam splitter 701, a third ¼ wave plate 702 and a sixth non-polarization beam splitter 703; and the fourth polarization modulation channel 80 includes a reflecting mirror 801, a fourth ¼ wave plate 802, and a reflecting mirror 803. The non-polarization beam splitters (501, 503, 601, 603, 701, 703) and the reflecting mirrors (801, 803) are all ideal devices, and their polarization effects are not considered. However, the transmission reflectance ratios of the non-polarizing beam splitters are important parameters of the device. In the present invention, the first non-polarization beam splitter 501 has a transmission reflectance ratio of 1:3, the third non-polarization beam splitter 601 has a transmission reflectance ratio of 2:1, the fifth non-polarization beam splitter 701 has a transmission reflectance ratio of 1:1, and the second, fourth and sixth non-polarization beam splitters (503, 603, 703) all have a transmission reflectance ratio of 1:1. Thus, the intensities of the sub-pulse beams passing through the four polarization modulation channels are approximately equal. Fast axis azimuths of the first to fourth ¼ wave plates (502, 602, 702, 802) are respectively set to 0°, 22.5°, 45° and 60°, and thus, the Stokes vectors of the sub-pulse beams modulated by the four polarization modulation channels are respectively $S_a=[1, 1, 0, 0]^T$, $S_b=[1, 0.5, 0.5, 0.707]^T$, $S_c=[1, 0, 0, 1]^T$ and $S_d=[1, 0.25, 0.433, 0.866]^T$.

The intervals among the first to fourth polarization modulation channels 50-80 satisfy $L_1=L_2=L_3=0.6$ m, and the length of each polarization modulation channel satisfies $L_4=0.3$ m. Then, the optical path length of the first sub-pulse beam modulated by the first polarization modulation channel 50 is $d_1=L_4=0.3$ m, the optical path length of the second sub-pulse beam modulated by the second polarization modulation channel 60 is $d_2=2L_1+L_4=1.5$ m, the optical path length of the third sub-pulse beam modulated by the third polarization modulation channel 70 is $d_3=2L_1+2L_2+L_4=2.7$ m, and the optical path length of the fourth sub-pulse beam modulated by the fourth polarization modulation channel 80 is $d_4=2L_1+2L_2+2L_3+L_4=3.9$ m. In view of the light speed of $3\times10^8$ m/s, the time delays of the first to fourth sub-pulse beams introduced by the corresponding polarization modulation channels are 1 ns, 5 ns, 9 ns and 13 ns, respectively.

In summary, the functions of the first to fourth polarization modulation channels 50-80 include: splitting a nanosecond pulse beam generated by the short-pulse laser source 10 into four sub-pulse beams; modulating, by using ¼ wave plates with different azimuths, into polarized pulse beams with uncorrelated Stokes vectors; and introducing, by different optical path lengths, different time delays for four sub-pulse beams, so that the four polarization pulses are successively incident on the surface of the sample to be tested.

In the reflected light path, the transmission reflectance ratios of the seventh and eighth non-polarization beam splitters 1001, 1101 are 2:1 and 1:1, respectively. The two non-polarization beam splitters are used in series so that any one of the sub-pulse beams entering the reflected light path is equally split into three sub-beams. The entire reflected light path is thus also divided into three branch detection light paths. The first branch detection light path consists essentially of the fifth ¼ wave plate 1002, the first polarization beam splitter 1003, the first converging lens 1004, the first photomultiplier tube 1005, the first amplifier 1006, the second converging lens 1007, the second photomultiplier tube 1008 and the second amplifier 1009. The second branch detection light path consists essentially of the ½ wave plate 1102, the second polarization beam splitter 1103, the third converging lens 1104, the third photomultiplier tube 1105, the third amplifier 1106, the fourth converging lens 1107, the fourth photomultiplier tube 1108 and the fourth amplifier 1109. The third branch detection light path consists essentially of the third polarizing beam splitter 1201, the fifth converging lens 1202, the fifth photomultiplier tube 1203, the fifth amplifier 1204, the sixth converging lens 1205, the sixth photomultiplier tube 1206 and the sixth amplifier 1207. Fast axis azimuths of the fifth ¼ wave plate 1002 and the ½ wave plate 1102 are respectively are set to 45° and 22.5°. In addition, the parametric performance of the same devices selected in the reflected light path is approximately the same and the seventh and eighth non-polarization beam splitters 1001, 1101 are ideal devices whose polarization effects are ignored. The photomultiplier tubes (1005, 1008, 1105, 1108, 1203 and 1206) have a response time of about 0.57 ns, the amplifiers (1006, 1009, 1106, 1109, 1204 and 1207) have a response time of about 1.2 ns, the oscilloscope 1301 has a response time of about 0.5 ns, and the oscilloscope 1301 has a minimum detectable pulse width of about 2 ns, so that detection modules are fully capable of detecting intensities of the sub-pulse beams.

Thus, the method for performing Mueller matrix elliptical polarization measurement using the device includes the following steps:

(1) Adjusting the incident angle of the incident light path to be approximately equal to the Brewster angle of the sample to be tested;

(2) starting the short-pulse laser source 10, which generates a series of Gaussian-shaped pulse beams with a pulse interval of 20 ns and a pulse width of 2 ns;

(3) Expanding and collimating, by the beam expander 20, the pulse beam into a parallel beam with a certain diameter, and modulating, by the polarizer 40, the parallel beam into a x-directional linearly polarized pulse beam after it is reflected by the reflecting mirror 30;

splitting the polarized pulse beam into four sub-pulse incident beams by the first non-polarization beam splitter 501, the third non-polarization beam splitter 601 and the fifth non-polarization beam splitter 701, and respectively modulating the four sub-pulse incident beams by the first to fourth polarization modulation channels 50-80, in which a first sub-pulse incident beam is first modulated by the ¼ wave plate 502 with a fast axis azimuth of 0° in the first polarization modulation channel 50, and then incident on the surface of the sample to be tested, the Stokes vector of the first sub-pulse incident beam being $S_a[1, 1, 0, 0]^T$;

a second sub-pulse incident beam is first modulated by the ¼ wave plate 602 with a fast axis azimuth of 22.5° in the second polarization modulation channel 60, and then incident on the surface of the sample to be tested, the Stokes vector of the second sub-pulse incident beam being $S_b=[1, 0.5, 0.5, 0.707]^T$;

a third sub-pulse incident beam is first modulated by the ¼ wave plate 702 with a fast axis azimuth of 45° in the third polarization modulation channel 70, and then incident on the surface of the sample to be tested, the Stokes vector of the third sub-pulse incident beam being $S_c=[1, 0, 0, 1]^T$;

a fourth sub-pulse incident beam is first modulated by the ¼ wave plate 802 with a fast axis azimuth of 60° in the fourth polarization modulation channel 80, and then incident on the surface of the sample to be tested, the Stokes vector of the fourth sub-pulse incident beam being $S_d=[1, 0.25, 0.433, 0.866]^T$;

Since $L_1=L_2=L_3=0.6$ m and $L_4=0.3$ m, optical path lengths of the four sub-pulse incident beams in the four polarization modulation channels 50-80 are 0.3 m, 1.5 m, 2.7 m and 3.9 m, respectively. Correspondingly, the four sub-pulse incident beams have an interval of 4 ns, the interval between the first sub-pulse incident beam and the Gaussian-shaped pulse beam generated by the laser source is 1 ns, and the interval between the fourth sub-pulse incident beam and the first sub-pulse incident beam in the next pulse repetition period is 8 ns;

(4) Assuming that the 4×4 Mueller matrix of the sample to be tested 90 is $M_s$, its variation within the pulse repetition period of 20 ns of the laser light source is ignored, but its variation between adjacent two pulse repetition periods is considered. That is, within the kth pulse repetition period of 20 ns, the Mueller matrix of the sample to be tested is $M_s(k)$, and within the (k+1)th pulse repetition period of 20 ns, the Mueller matrix of the sample to be tested is $M_s(k+1)$;

successively irradiating the four sub-pulse incident beams within each pulse repetition period of 20 ns on the surface of the sample to be tested 90, so that four sub-pulse reflected beams successively enter the reflected light path;

(5) Within the kth pulse repetition period of 20 ns, splitting, by the polarization analyzer 50 in the reflected light path, any one of the sub-pulse reflected beams enters the reflected light path into six smaller sub-beams, and detecting, by the photomultiplier tubes (1005, 1008, 1105, 1108, 1203 and 1206), individual light intensities of the sub-beams in 2 ns, the light intensities being respectively recorded as $I_1 \sim I_6$, so that according to the Stokes vector definition, the Stokes vector corresponding to the sub-pulse reflected beam is represented as:

$$S_m = [S_0, S_1, S_2, S_3]^T,$$

where $S_0 = (I_1/g_1 + I_2/g_2 + I_3/g_3 + I_4/g_4 + I_5/g_5 + I_6/g_6)$,
$S_1 = (I_1/g_1 - I_2/g_2)/(I_1/g_1 + I_2/g_2)$,
$S_2 = (I_3/g_3 - I_4/g_4)/(I_3/g_3 + I_4/g_4)$,
$S_3 = (I_5/g_5 - I_6/g_6)/(I_5/g_5 + I_6/g_6)$,
where $g_1 \sim g_6$ represents gain coefficients of the detection channels in the reflected light path;

(6) Similarly to the step (5), successively detecting Stokes vectors of the four sub-pulse reflected beams within the kth pulse repetition period of 20 ns in the reflected light path, and respectively recording the four Stokes vectors as $S_{ma}(k)$, $S_{mb}(k)$, $S_{mc}(k)$ and $S_{md}(k)$;

(7) Solving linear equations $S_{ma}(k) = M_s(k) \cdot S_a$, $S_{md}(k) = M_s(k) \cdot S_b$, $S_{md}(k) = M_s(k) \cdot S_c$ and $S_{md}(k) = M_s(k) \cdot S_d$ to obtain a Mueller matrix $M_s(k)$ of the sample within the kth pulse repetition period of 20 ns;

Similarly, through the above measurement steps, the Mueller matrix in other any pulse repetition period can also be directly obtained. Thus, the dynamic Mueller matrix $M_s(k)$ of the sample can be obtained by the above measuring device, and the temporal resolution can reach 20 ns.

Figure 2:
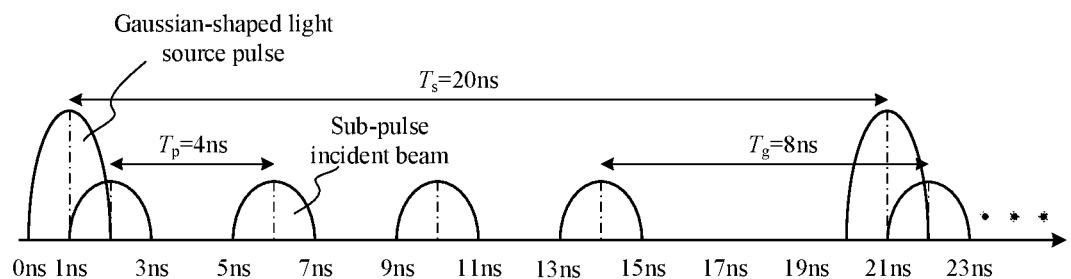
FIG. 2 is a timing diagram of pulse beams according to the embodiments of the present invention.

As shown in FIG. 2, a timing diagram of pulse beams according to the embodiments of the present invention is illustrated. The short-pulse laser source 10 generates a Gaussian-shaped light source pulse with a pulse width of 2 ns and a pulse repetition period of $T_s = 20$ ns, which is then equally split into four sub-pulse incident beams by the first non-polarization beam splitter 501, the third non-polarization beam splitter 601 and the fifth non-polarization beam splitter 701 in the first to third polarization modulation channels 50-70. The four sub-pulse incident beams have an interval of $T_p = 4$ ns, the first sub-pulse incident beam lags the Gaussian-shaped light source pulse by 1 ns, and the fourth beam sub-pulse incident beam leads a first sub-pulse incident beam in the next pulse repetition period by $T_g = 8$ ns. According to this beam pulse timing setting, the oscilloscopes 1301 and 1302 can achieve equal interval sampling of 2 ns. With the interval $T_g = 8$ ns, the system can select appropriate starting measurement data and ensure that the detection data of every four sub-pulse incident beams is used for calculation of the Mueller matrix of the sample to be tested 90.

Figure 3:
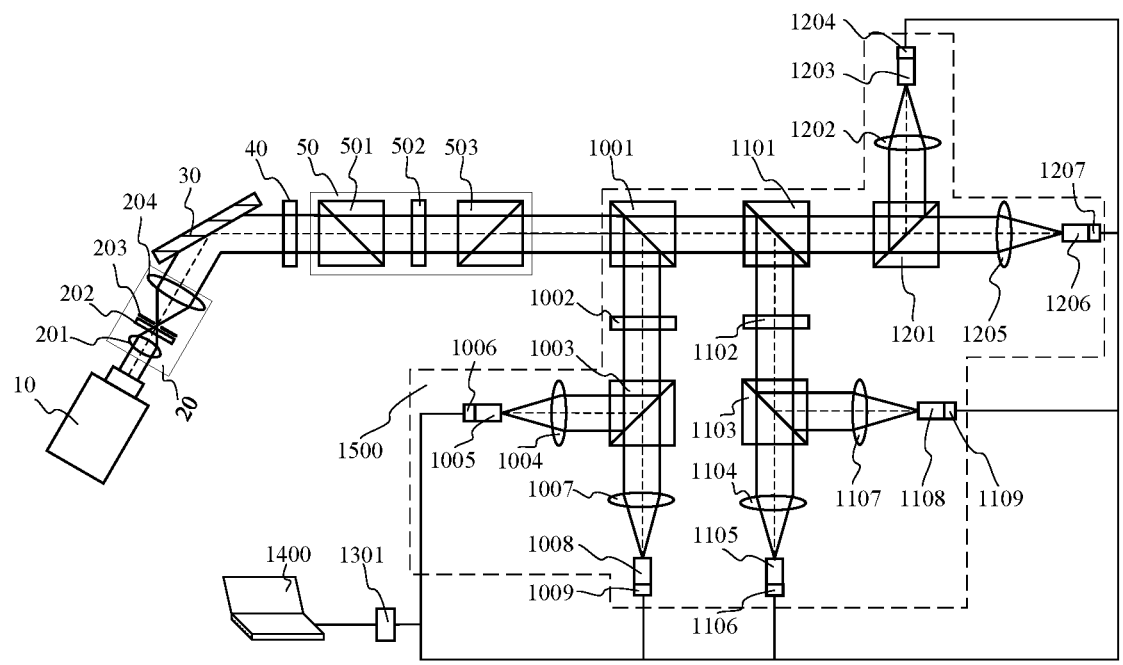
FIG. 3 is a first schematic diagram showing calibration of the measuring device according to the embodiments of the present invention.

FIG. 3 is a first schematic diagram showing calibration of the measuring device according to the embodiments of the present invention. As shown FIG. 3, only a first polarization modulation channel 50 is mounted in the incident light path (which can also be understood as blockage of the reflected light path of the first non-polarization beam splitter 501), and the first sub-pulse incident beam is directly incident perpendicularly into the polarization detection module 1500. In this calibration light path, parameters to be calibrated mainly include: azimuth $\alpha_1$ of the polarizer 40, fast axis azimuth $\alpha_2$ and phase delay amount $\delta_1$ of the first ¼ wave plate 502, fast axis azimuth $\alpha_3$ and phase delay amount $\delta_2$ of the fifth ¼ wave plate 1002, fast axis azimuth $\alpha_4$ and phase delay amount $\delta_3$ of the ½ wave plate 1102 and real-time gain coefficients $g_1 \sim g_6$ of the respective light intensity detection channels. In order to achieve the above calibration, the following calibration steps are established:

(1) changing an nominal azimuth angle $\alpha_1 + \beta_1$ of the second polarizer 40 by a turn table so that in the range of 0° to 360°, $\beta_1$ is changed at an equal interval of 10° ($\beta_1 = 10° \times n$, n=1, 2, 3, . . . , 37) and the polarization detection module 1500 obtains a corresponding 6×37 light intensity matrix $I_1$;

(2) changing an nominal azimuth angle $\alpha_2 + \beta_2$ of the first ¼ wave plate 502 by a turn table so that in the range of 0° to 360°, $\beta_2$ is changed at an equal interval of 10° ($\beta_2 = 10° \times n$, n=1, 2, 3, . . . , 37) and the polarization detection module 1500 obtains a corresponding 6×37 light intensity matrix $I_2$; and (3) performing inversion fitting of the light intensity matrixes $I_1$ and $I_2$ to calculate the above parameters to be solved.

Figure 4:
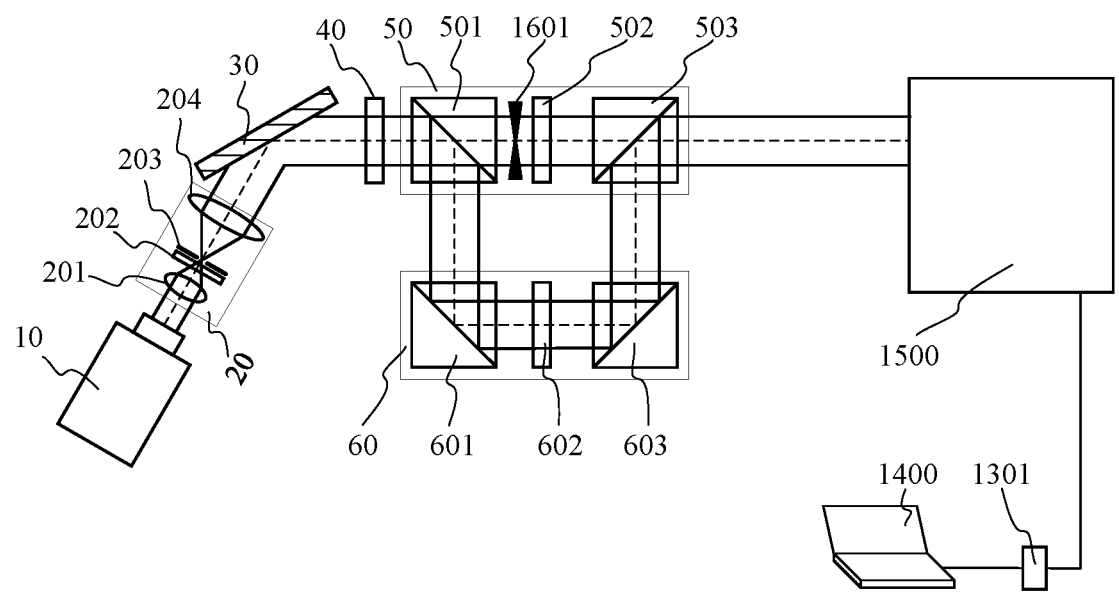
FIG. 4 is a second schematic diagram showing calibration of the measuring device according to the embodiments of the present invention.

FIG. 4 is a second schematic diagram showing calibration of the measuring device according to the embodiments of the present invention. As shown FIG. 4, an aperture 1601 is provided in the first polarization modulation channel 50 to block the transmission of the first sub-pulse incident beam in the first polarization modulation channel 50. Meanwhile, the second sub-pulse incident beam is modulated by the second polarization modulation channel 60, and then directly incident perpendicularly into the polarization detection module 1500. In this calibration light path, parameters to be calibrated mainly include: fast axis azimuth $\alpha_5$ and phase delay amount $\delta_4$ of the second ¼ wave plate 602 and real-time gain coefficients $g_1 \sim g_6$ of the respective light intensity detection channels. In order to achieve the above calibration, the following calibration steps are established:

(1) changing an nominal azimuth angle $\alpha_5 + \beta_3$ of the third ¼ wave plate 602 by a turn table so that in the range of 0° to 360°, $\beta_3$ is changed at an equal interval of 10° ($\beta_3 = 10° \times n$, n=1, 2, 3, . . . , 37) and the polarization detection module 1500 obtains a corresponding 6×37 light intensity matrix $I_3$; and (2) performing inversion fitting of the light intensity matrix $I_3$ to calculate the above parameters to be solved.

Figure 5:
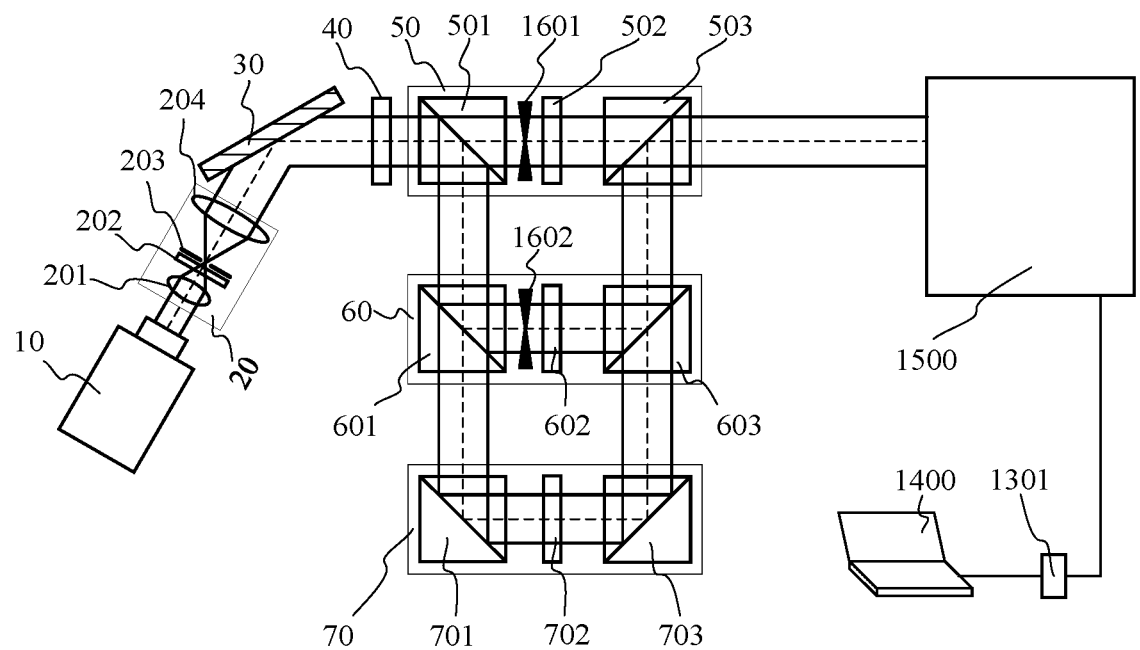
FIG. 5 is a third schematic diagram showing calibration of the measuring device according to the embodiments of the present invention.

FIG. 5 is a third schematic diagram showing calibration of the measuring device according to the embodiments of the present invention. As shown FIG. 5, an aperture 1602 is provided in the second polarization modulation channel 60 to block the transmission of the second sub-pulse incident beam in the second polarization modulation channel 60. Further, the aperture 1601 still blocks the transmission of the first sub-pulse incident beam in the first polarization modulation channel 50. Meanwhile, the third sub-pulse incident beam is modulated by the third polarization modulation channel 70, and then directly incident perpendicularly into the polarization detection module 1500. In this calibration light path, parameters to be calibrated mainly include: fast axis azimuth $\alpha_6$ and phase delay amount $\delta_5$ of the third ¼ wave plate 702 and real-time gain coefficients $g_1 \sim g_6$ of the respective light intensity detection channels. In order to achieve the above calibration, the following calibration steps are established:

(1) changing an nominal azimuth angle $\alpha_6 + \beta_4$ of the third ¼ wave plate 702 by a turn table so that in the range of 0° to 360°, $\beta_4$ is changed at an equal interval of 10° ($\beta_4 = 10° \times n$, n=1, 2, 3, . . . , 37) and the polarization detection module 1500 obtains a corresponding 6×37 light intensity matrix $I_4$; and (2) performing inversion fitting of the light intensity matrix $I_4$ to calculate the above parameters to be solved.

Figure 6:
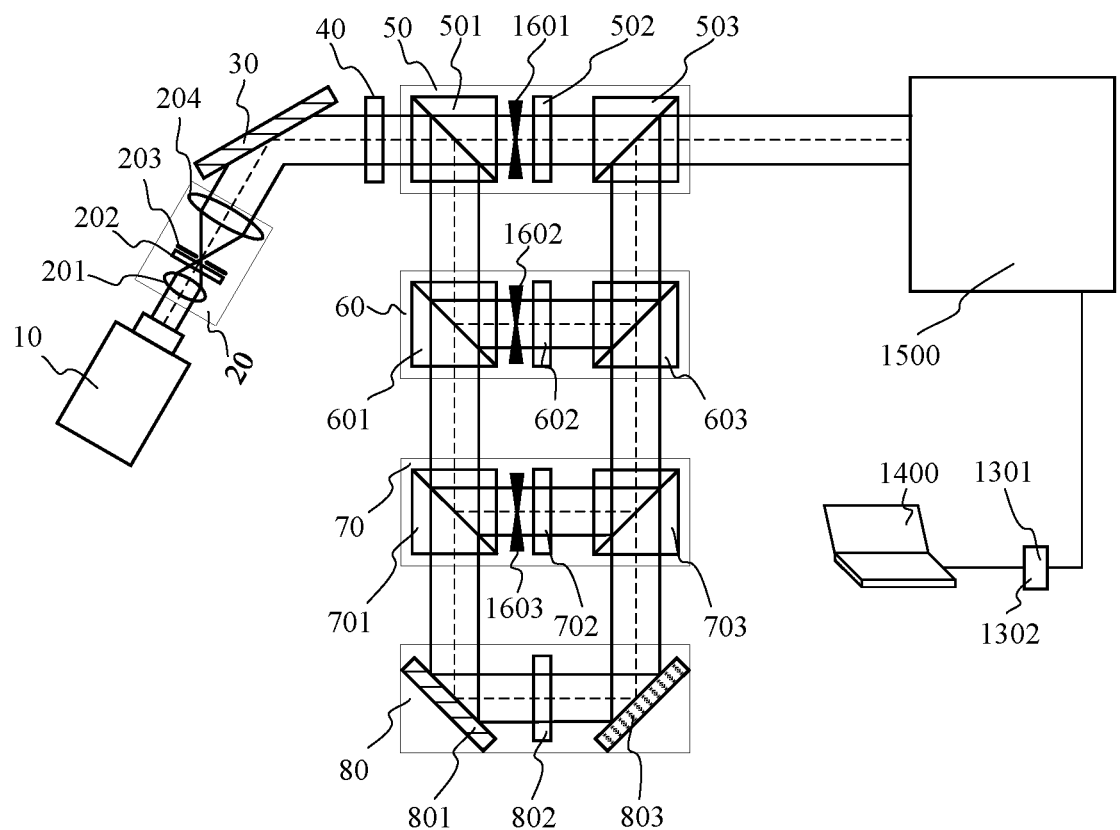
FIG. 6 is a fourth schematic diagram showing calibration of the measuring device according to the embodiments of the present invention.

FIG. 6 is a fourth schematic diagram showing calibration of the measuring device according to the embodiments of the present invention. As shown FIG. 6, an aperture 1603 is provided in the third polarization modulation channel 70 to block the transmission of the third sub-pulse incident beam in the third polarization modulation channel 70. Further, the aperture 1601 still blocks the transmission of the first sub-pulse incident beam in the first polarization modulation channel 50, and the aperture 1602 still blocks the transmission of the second sub-pulse incident beam in the second polarization modulation channel 60. Meanwhile, the fourth sub-pulse incident beam is modulated by the fourth polarization modulation channel 80, and then directly incident perpendicularly into the polarization detection module 1500. In this calibration light path, parameters to be calibrated mainly include: fast axis azimuth $\alpha_7$ and phase delay amount $\delta_6$ of the fourth ¼ wave plate 802 and real-time gain coefficients $g_1 \sim g_6$ of the respective light intensity detection channels. In order to achieve the above calibration, the following calibration steps are established:

(1) changing an nominal azimuth angle $\alpha_7+\beta_5$ of the fourth ¼ wave plate 802 by a turn table so that in the range of 0° to 360°, $\beta_5$ is changed at an equal interval of 10° ($\beta_5=10°\times n$, $n=1, 2, 3, \ldots, 37$) and the polarization detection module 1500 obtains a corresponding 6×37 light intensity matrix $I_5$; and (2) performing inversion fitting of the light intensity matrix $I_4$ to calculate the above parameters to be solved.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. A high temporal resolution Mueller matrix elliptical polarization measuring device for measuring a Mueller matrix of a material to be tested, characterized by comprising an incident light path and a reflected light path;

the incident light path includes a short-pulse laser source, a polarizer and first to fourth polarization modulation channels; a beam emitted by the short-pulse laser source passes through the polarizer successively enters the first to fourth polarization modulation channels, and is then subjected to polarization modulation by first to fourth ¼ wave plates having different azimuths in the first to fourth polarization modulation channels, so that four sub-pulse incident beams with uncorrelated Stokes vectors are obtained, successively projected onto the material to be tested and then enter the reflected light path after being reflected by the material to be tested;

the reflected light path includes two non-polarization beam splitter, a fifth ¼ wave plate, a ½ wave plate a first polarization beam splitter, a second polarization beam splitter a third polarization beam splitter, six detection modules, an oscilloscope and a computer;

the beam reflected by the material to be tested is split into three beams by two non-polarization beam splitters; a first beam is modulated by the fifth ¼ wave plate and enters the first polarization beam splitter a second beam is modulated by the ½ wave plate and enters the second polarization beam splitter, and a third beam enters the third polarization beam splitter; the three beams are split into six beams by the first to third polarization beam splitters, the six beams are converted into electrical signals by six detection modules in one-to-one correspondence, and then the electrical signals enters the oscilloscope and the computer.

2. The high temporal resolution Mueller matrix elliptical polarization measuring device of claim 1, characterized in that the first polarization modulation channel includes a first non-polarization beam splitter, a first ¼ wave plate and a second non-polarization beam splitter sequentially arranged in order of light propagation; the first non-polarization beam splitter and the second non-polarization beam splitter are perpendicular to each other and reflective surfaces thereof are oppositely disposed;

the second polarization modulation channel includes a third non-polarization beam splitter, a second ¼ wave plate and a fourth non-polarization beam splitter sequentially arranged in order of light propagation; the third non-polarization beam splitters and the fourth non-polarization beam splitter are perpendicular to each other and reflective surfaces thereof are oppositely disposed;

the third polarization modulation channel includes a fifth non-polarization beam splitter, a third ¼ wave plate and a sixth non-polarization beam splitter sequentially arranged in order of light propagation; the fifth non-polarization beam splitters and the sixth non-polarization beam splitter are perpendicular to each other and reflective surfaces thereof are oppositely disposed;

the fourth polarization modulation channel includes a first reflecting mirror, a fourth ¼ wave plate and a second reflecting mirror sequentially arranged in order of light propagation; the first reflecting mirror and the second reflecting mirror are perpendicular to each other and reflective surfaces thereof are oppositely disposed;

the first non-polarization beam splitter, the third non-polarization beam splitter, the fifth non-polarization beam splitter and the first reflecting mirror are parallel to each other; and the second non-polarization beam splitter, the fourth non-polarization beam splitter, the sixth non-polarization beam splitter and the second reflecting mirror are parallel to each other.

3. The high temporal resolution Mueller matrix elliptical polarization measuring device of claim 2, characterized in that the first to fourth polarization modulation channels are equally spaced, and have the same length.

4. The high temporal resolution Mueller matrix elliptical polarization measuring device of claim 2, characterized in that the interval between the first and second polarization modulation channels is $L_1$, the interval between the second and third polarization modulation channels is $L_2$, the interval between the third and fourth polarization modulation channels is $L_3$, and lengths of the first to fourth polarization modulation channels are all $L_4$, where $L_1=L_2=L_3=2L_4$.

5. The high temporal resolution Mueller matrix elliptical polarization measuring device of claim 4, characterized in that $L_4=0.3$ m.

6. The high temporal resolution Mueller matrix elliptical polarization measuring device of claim 1, characterized in that fast axis azimuths of the first to fourth ¼ wave plates are 0°, 22.5°, 45°, and 60°, respectively.

7. The high temporal resolution Mueller matrix elliptical polarization measuring device of claim 1, characterized in that the short-pulse laser source is configured to provide Gaussian-shaped light source pulses with a period of 20 ns and a pulse width of 2 ns.

8. The high temporal resolution Mueller matrix elliptical polarization measuring device of claim 1, characterized in that transmission reflectance ratios of the two non-polarization beam splitters are 2:1 and 1:1, respectively.

9. A Mueller matrix elliptical polarization measuring method using the high temporal resolution Mueller matrix elliptical polarization measuring device, characterized by comprising:

(1) adjusting an incident angle of the incident light path to be approximately equal to the Brewster angle of the sample to be tested;

(2) generating a series of Gaussian-shaped pulse beams with a pulse interval of $T_s$;

(3) splitting each pulse beam into four beams, and then modulating the four beams into four sub-pulse incident beams with uncorrelated Stokes vectors by four ¼ wave plates with different fast axis azimuths, the Stokes vectors of the four sub-pulse incident beams being $S_a$, $S_b$, $S_c$ and $S_d$;

(4) assuming that 4×4 Mueller matrix of the sample to be tested is $M_s$, the Mueller matrix of the sample to be tested is $M_s(k)$ within the kth pulse repetition period of $T_s$, and the Mueller matrix of the sample to be tested is $M_s(k+1)$ within the (k+1)th pulse repetition period of $T_s$, successively irradiating the four sub-pulse incident beams within each pulse repetition period of $T_s$ on the surface of the sample to be tested so that corresponding four sub-pulse reflected beams successively enter the reflected light path;

(5) within the kth pulse repetition period of $T_s$, splitting any one of the sub-pulse reflected beams entering the reflected light path into six smaller sub-beams, and detecting light intensities of the six sub-beams, the light intensities of the six sub-beams being respectively recorded as $I_1 \sim I_6$, so that the Stokes vector corresponding to the sub-pulse reflected beam is represented as:

$$S_m = [S_0, S_1, S_2, S_3]^T,$$

where $S_0 = (I_1/g_1 + I_2/g_2 + I_3/g_3 + I_4/g_4 + I_5/g_5 + I_6/g_6)$,
$S_1 = (I_1/g_1 - I_2/g_2)/(I_1/g_1 + I_2/g_2)$,
$S_2 = (I_3/g_3 - I_4/g_4)/(I_3/g_3 + I_4/g_4)$,
$S_3 = (I_5/g_5 - I_6/g_6)/(I_5/g_5 + I_6/g_6)$, where $g_1 \sim g_6$ represents gain coefficients during the detection of light intensities of the six sub-beams;

(6) similarly to the step (5), obtaining Stokes vectors of the four sub-pulse reflected beams within the kth pulse repetition period of $T_s$, the Stokes vectors being respectively $S_{ma}(k)$, $S_{mb}(k)$, $S_{mc}(k)$ and $S_{md}(k)$; and (7) solving linear equations $S_{ma}(k) = M_s(k) \cdot S_a$, $S_{mb}(k) = M_s(k) \cdot S_b$, $S_{mc}(k) = M_s(k) \cdot S_c$ and $S_{md}(k) = M_s(k) \cdot S_d$ to obtain a Mueller matrix $M_s(k)$ of the sample within the kth pulse repetition period of $T_s$.

10. The Mueller matrix elliptical polarization measuring method using the high temporal resolution Mueller matrix elliptical polarization measuring device of claim 9, characterized in that in the step (3):

a first sub-pulse incident beam is modulated by the ¼ wave plate with a fast axis azimuth of 0°, and is then incident on the surface of the sample to be tested, the Stokes vector of the first sub-pulse incident beam being $S_a = [1, 1, 0, 0]^T$;

a second sub-pulse incident beam is modulated by the ¼ wave plate with a fast axis azimuth of 22.5°, and is then incident on the surface of the sample to be tested, the Stokes vector of the second sub-pulse incident beam being $S_b = [1, 0.5, 0.5, 0.707]^T$;

a third sub-pulse incident beam is modulated by the ¼ wave plate with a fast axis azimuth of 45°, and is then incident on the surface of the sample to be tested, the Stokes vector of the third sub-pulse incident beam being $S_c = [1, 0, 0, 1]^T$; and a fourth sub-pulse incident beam is modulated by the ¼ wave plate with a fast axis azimuth of 60°, and is then incident on the surface of the sample to be tested, the Stokes vector of the fourth sub-pulse incident beam being $S_d = [1, 0.25, 0.433, 0.866]^T$.

* * * * *